United States Patent
Yu et al.

(10) Patent No.: US 6,853,474 B2
(45) Date of Patent: Feb. 8, 2005

(54) PROCESS FOR FABRICATING OPTICAL SWITCHES

(75) Inventors: Chris C. Yu, Conneautville, PA (US); Vlasta Brusic, Geneva, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 99 days.

(21) Appl. No.: 10/117,554

(22) Filed: Apr. 4, 2002

(65) Prior Publication Data

US 2003/0189025 A1 Oct. 9, 2003

(51) Int. Cl.⁷ .............................. G02F 1/11; G02F 1/33
(52) U.S. Cl. ...................................... 359/285; 359/305
(58) Field of Search ............................ 359/285, 286, 359/287, 305, 313, 314; 333/193

(56) References Cited

U.S. PATENT DOCUMENTS

| | | | |
|---|---|---|---|
| 4,789,648 A | 12/1988 | Chow et al. | |
| 4,956,313 A | 9/1990 | Cote et al. | |
| 4,980,596 A | * 12/1990 | Sacks et al. | 310/313 D |
| 4,991,923 A | * 2/1991 | Kino et al. | 385/1 |
| 5,137,544 A | 8/1992 | Medellin | |
| 5,157,876 A | 10/1992 | Medellin | |
| 5,209,816 A | 5/1993 | Yu et al. | |
| 5,244,523 A | 9/1993 | Tollini | |
| 5,340,370 A | 8/1994 | Cadien et al. | |
| 5,354,490 A | 10/1994 | Yu et al. | |
| 5,391,258 A | 2/1995 | Brancaleoni et al. | |
| 5,476,606 A | 12/1995 | Brancaleoni et al. | |
| 5,527,423 A | 6/1996 | Neville et al. | |
| 5,783,489 A | 7/1998 | Kaufman et al. | |
| 5,954,997 A | 9/1999 | Kaufman et al. | |
| 5,993,686 A | 11/1999 | Streinz et al. | |
| 6,015,506 A | 1/2000 | Streinz et al. | |
| 6,033,596 A | 3/2000 | Kaufman et al. | |
| 6,039,891 A | 3/2000 | Kaufman et al. | |
| 6,063,306 A | 5/2000 | Kaufman et al. | |
| 6,068,787 A | 5/2000 | Grumbine et al. | |

OTHER PUBLICATIONS

Bishop, et al., "The Rise of Optical Switching", Scientific American, ISSN 0036–8733 Munn & Company, Jan. 2001, vol. 284(1), pp. 88–94.

* cited by examiner

Primary Examiner—Scott J. Sugarman
Assistant Examiner—Richard Hanig
(74) Attorney, Agent, or Firm—Alison J. Baldwin

(57) ABSTRACT

A process for fabricating micro-acousto-optic modulators using microelectronics fabrication technology. First, a set of trenches is etched into a substrate. Then, a transducer material is deposited into these trenches, followed by removal of any transducer material located above the surface of the substrate. Next, a second set of trenches is etched on both sides of the transducer material, between the transducer material and the substrate. Then, an electrode material is deposited into the second set of trenches. Finally, any electrode material located above the surface of the substrate is removed such that the surface of the substrate is co-planar with the electrode and transducer materials.

7 Claims, 7 Drawing Sheets

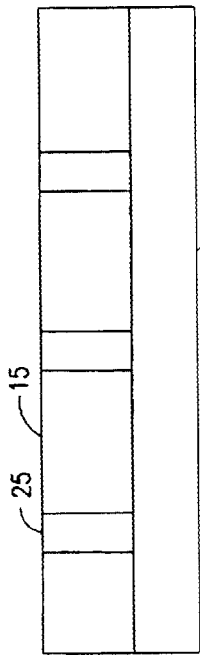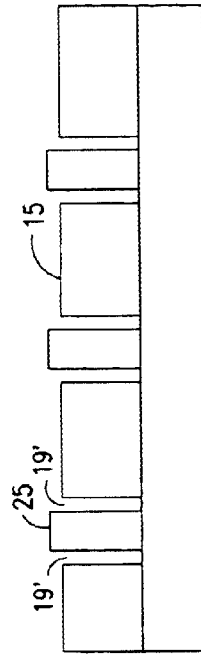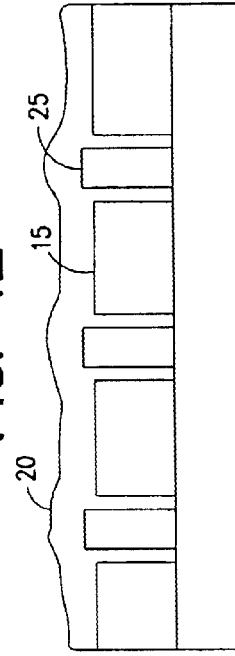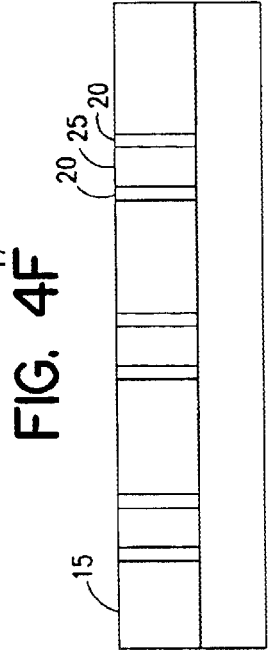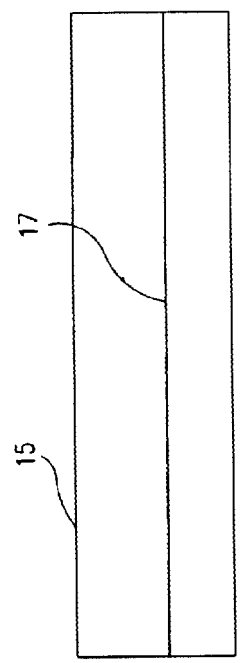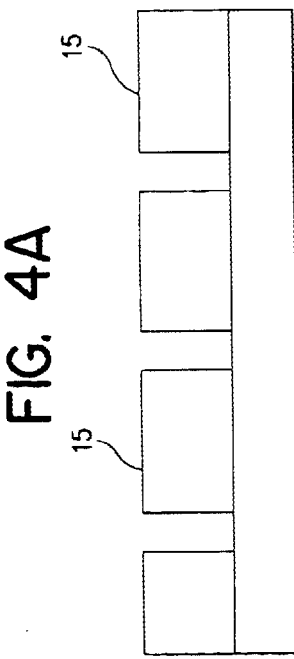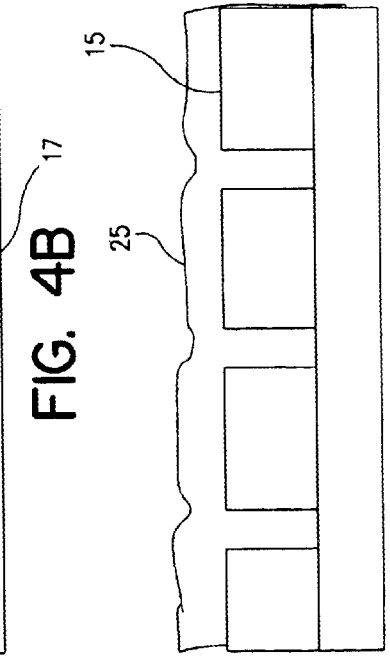

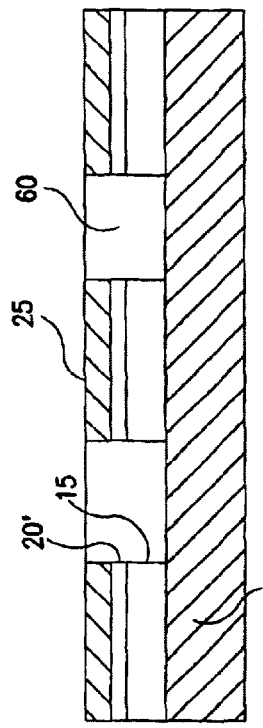
FIG. 5E
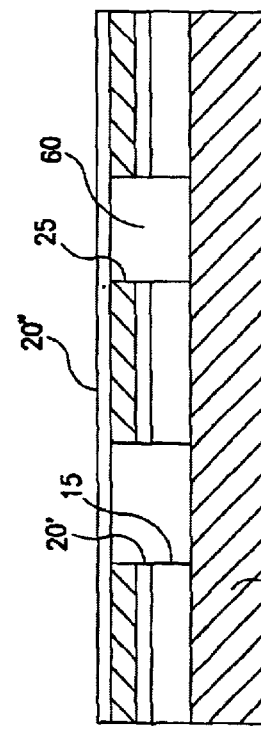
FIG. 5F
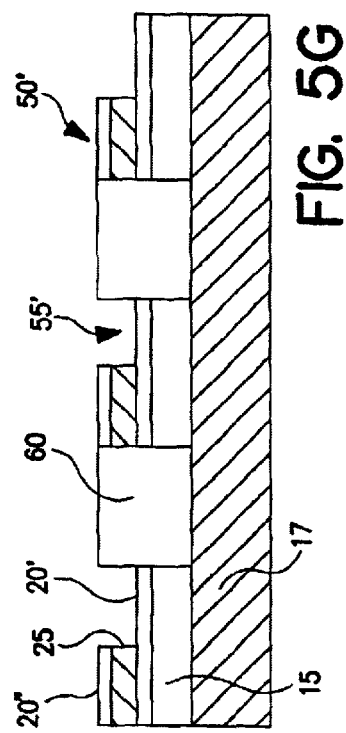
FIG. 5G
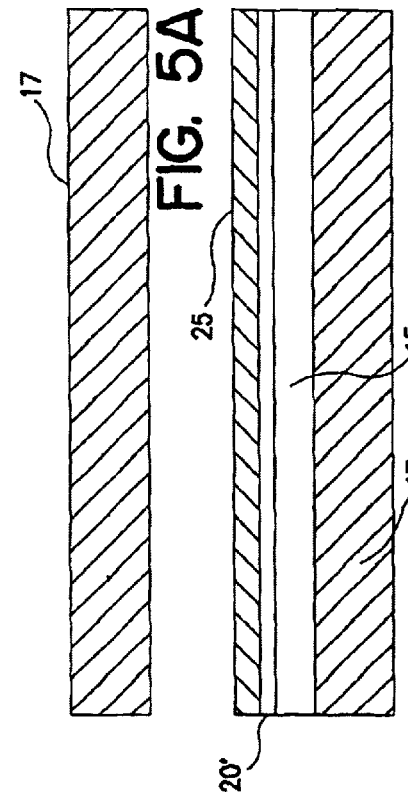
FIG. 5A
FIG. 5B
FIG. 5C
FIG. 5D
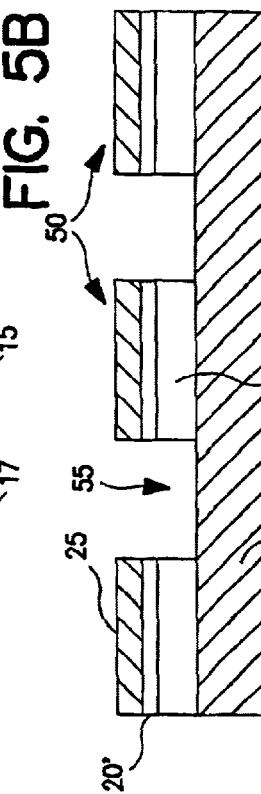
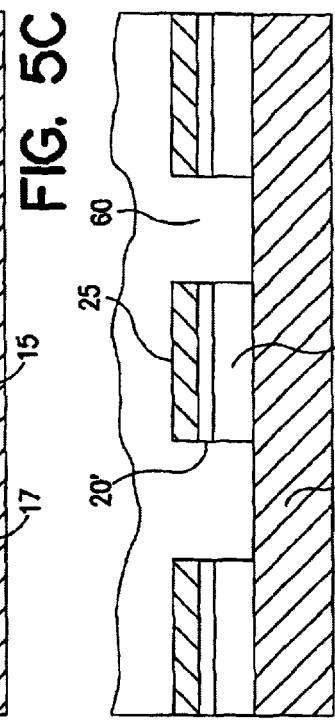

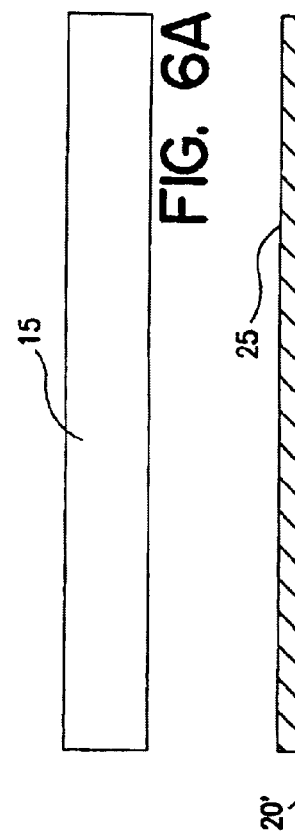
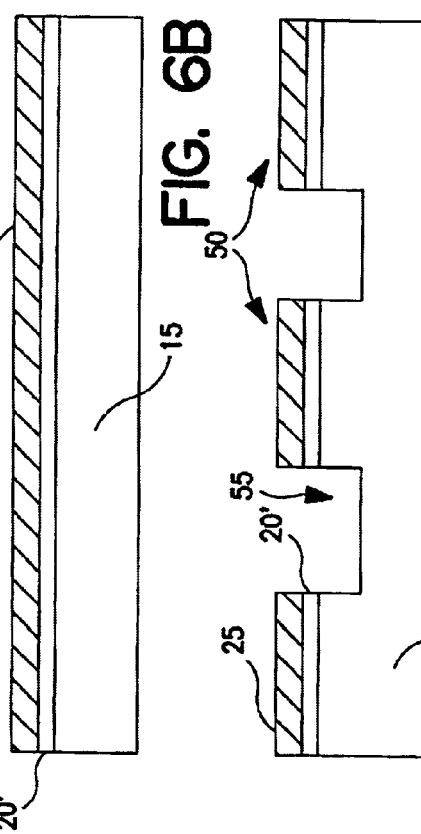
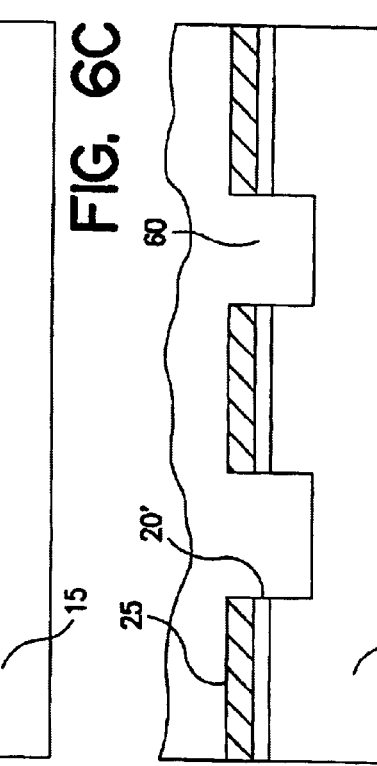
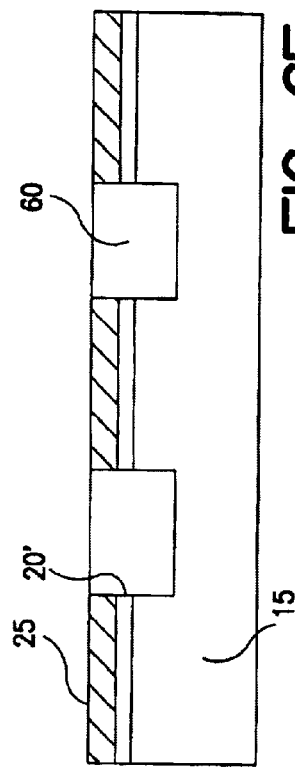
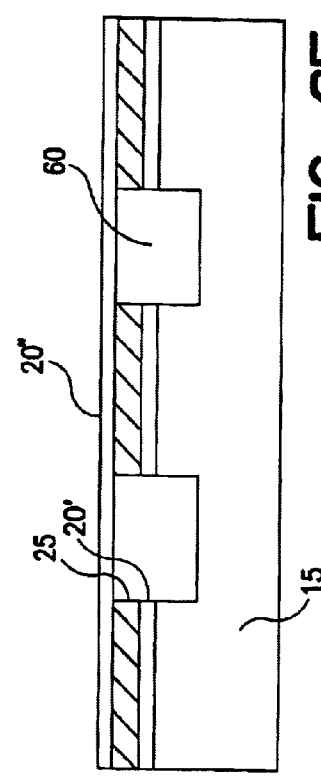
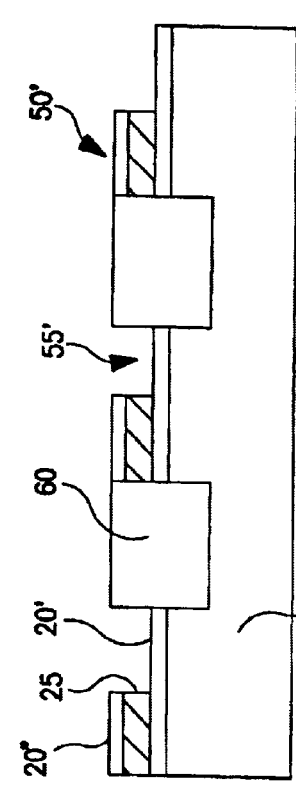

PROCESS FOR FABRICATING OPTICAL SWITCHES

FIELD OF THE INVENTION

The present invention relates to the field of optical switches. More specifically, the present invention relates to the manufacture of micro-acousto-optic modulators, which may be used as optical switches as well as optical switches manufactured by the methods of this invention.

BACKGROUND OF THE INVENTION

Currently, network and other telecommunications industries are utilizing optic signals of visible and invisible light wavelengths traveling down optical fibers to transfer information from one location with another. However, the switches currently used to redirect information down these optical pathways utilize electric signals instead of optic signal. Therefore, the optic signal from the optical fiber must be converted into an electric signal in order to pass through a switch and then reconverted into a optic signal before continuing its travel down another optical fiber. This switching process severely slows the travel time of information within a fiber optic network and increases the cost of transmitting that information. Therefore, as network and other telecommunications infrastructures rely more heavily upon optical fibers and optical-based technologies, the development and use of optical switches become increasingly important.

As discussed in D. J. Bishop et al., *The Rise of Optical Switching*, Scientific American, vol. 284(1), pp. 88–94 (2001), several approaches to optical switches are currently being investigated. Among these approaches, there are Micro-Electro-Mechanical Systems (MEMS), waveguide circuits, acousto-optical modulation, "micro-bubble" switches, and liquid crystal based switches. One key performance requirement for an optical switch is its ability to handle an increased number of input-to-output channels for meeting current and future bandwidth demand.

One way to meet this requirement is to increase optical switch density via reduction in optical switch size. While there are many ideas and options for optical switches, there have been few technologies that are able to meet the requirement of reduction in switch size along with demonstrated performance excellence, manufacturing robustness and operation reliability. Many of the existing optical switches are manufactured as discrete components. These components tend to be relatively large in size, expensive (due to extensive manual operations required), and manufactured at a lower yield. For example, acousto-optic modulator type switches, have a typical minimum component size of ~3 mm. Other approaches, such as MEMS, involve moving parts, which not only limit switching speed, but also raise concerns over reliability and lifetime of such device.

Therefore, there exists a need for optical switches that are small, robust, reliable, and that are simple to manufacture.

SUMMARY OF THE INVENTION

The present invention relates to a process for fabricating micro-acousto-optic modulators comprising etching a first set of trenches into a substrate having an exposed top surface; depositing a transducer material onto the exposed substrate surface and into the first set of trenches to form at least one transducer; removing the transducer material from the surface of the substrate; etching a second set of trenches into the substrate and adjacent to the transducer material, such that the transducer is sandwiched between two trenches; depositing an electrode material onto the exposed substrate surface and into the second set of trenches to form at least two electrodes; and removing electrode material from the surface of the substrate.

The present invention also relates to a process for fabricating micro-acousto-optic modulators, comprising forming a substrate having an exposed top surface; depositing a first layer of electrode material onto the surface of the substrate; depositing a layer of transducer material onto the first layer of electrode material; patterning the substrate, the first layer of electrode material and the transducer material to form a first plurality of features, each having a top surface, and to form gaps between the features; depositing a first material layer on top of the first plurality of features and into the gaps; polishing the first material layer to form a co-planer surface comprising the transducer material layer and the first material, wherein the first material layer remains in the gaps; depositing a second layer of electrode material onto the co-planar surface; patterning the second electrode material layer and the transducer material layer to form a second plurality of features, each having a top surface, and to form gaps between the second plurality of features, wherein a portion of the first electrode layer is exposed in the gaps; depositing a second material layer on top of the second plurality of features and into the gaps; patterning the second material layer to form at least one pair of interconnection trenches, wherein one interconnection trench exposes a portion of the first electrode material layer and the other trench exposes a portion of the second electrode material layer; depositing a third layer of electrode material onto the surface of the second material layer and into the interconnection trenches; patterning the third layer of electrode material to form pads of electrode material, wherein each pad is connected to only one interconnection trench containing third electrode material.

The present invention also relates to a micro-acousto-optic modulator comprising a substrate having at least one inlay comprising a first layer of electrode material, a layer of transducer material, and a second layer of electrode material, wherein the layer of transducer material is located between the first layer of electrode material and the second layer of electrode material.

The present invention further relates to a micro-acousto-optic modulator comprising a substrate having an exposed surface, a first layer of electrode material attached to the surface of the substrate, a layer of transducer material attached to the first layer of electrode material, and a second layer of electrode material attached to the layer of transducer material.

BRIEF DESCRIPTION OF THE DRAWINGS

FIGS. 4A–G is another embodiment of a process of the present invention.

FIGS. 5A–K is yet another embodiment of a process of the present invention.

FIGS. 6A–K is yet another embodiment of a process of the present invention.

DETAILED DESCRIPTION

In the present invention, a microelectronics process technology is utilized to manufacture micro acousto-optic modulators for optical switching. With this process, reduction in acousto-optic modulator size by a factor of up to 1000 can be achieved. In addition, because the resulting acousto-optic modulator does not involve moving parts, high speed, good reliability, and long lifetime are achievable.

Figure 1:
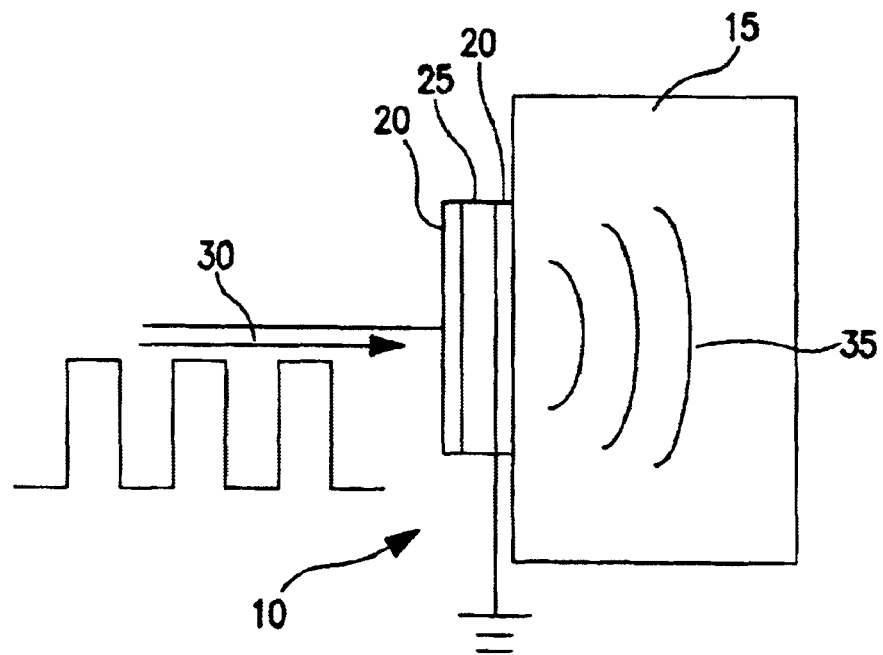
FIG. 1 is a schematic representation of an acousto-optic modulator based optical switch.
Figure 2:
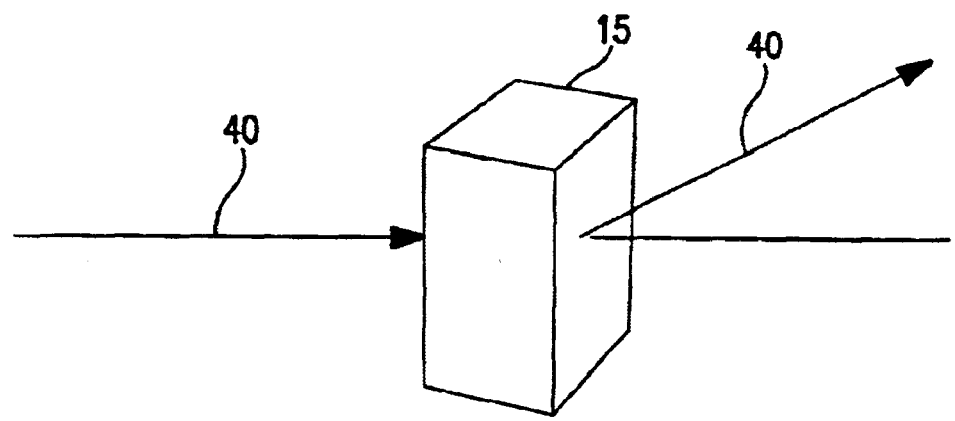
FIG. 2 is a schematic representation of the acousto-optic effect.

The processes of the present invention use many standard and well known microelectronics fabrication techniques including, but not limited to, lithography, dry etch techniques, wet etch techniques, demascene, chemical vapor deposition (CVD) and/or physical vapor deposition (PVD), and chemical mechanical polishing (CMP), to manufacture micro-acousto-optic modulators 10. As shown in FIGS. 1–2, micro-acousto-optic modulators 10 are used as optical switches to diffract light from an optical fiber. When an acoustic wave 35 is generated in a substrate 15, it causes spatially periodic density variations in the substrate 15 and, as a result, variations in refractive index of the substrate 15. Therefore, when a light 40 is intercepted by the acoustic wave 35 in the substrate 15, diffraction occurs due to the change in local refractive index. Acoustic wave 35 is generated in substrate 15 through the piezoelectric effect created when an AC voltage 30 is applied to a transducer 25, adjacent to a surface of substrate 15. AC voltage 30 is applied to transducer 25 through electrodes 20 positioned on both sides of transducer 25. Therefore, by manipulating AC voltage 30 to transducer 25, acoustic wave 35 may be controlled, which, in turn, controls the resulting diffraction of light 40.

FIGS. 3A–G and 4A–G, illustrate an embodiment of a process of the present invention for fabricating micro-acousto-optical modulators. In FIGS. 3A and 4A, a substrate 15 alone is used, or, alternatively, substrate 15 is formed on a base substrate 17. Substrate 15 may be a single crystal substrate or a polycrystalline substrate. Substrate 15 is preferably composed of a material having optimum photo-acoustic effect, while also preferably exhibiting low optical loss. Examples of suitable substrates 15 are those composed of silica and, most preferably, those composed of fused silica. The thickness of substrate 15 used in the present invention is dependent upon the specific requirements of the acousto-optical modulator fabricated and the specific steps of the disclosed process used in the fabrication. Generally, the thickness of substrate 15 will range from about 0.5 $\mu$m to about 100 $\mu$m.

Figure 3D:
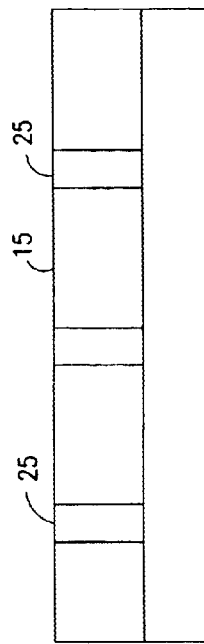
FIGS. 3A–G are an embodiment of a process of the present invention.
Figure 3E:
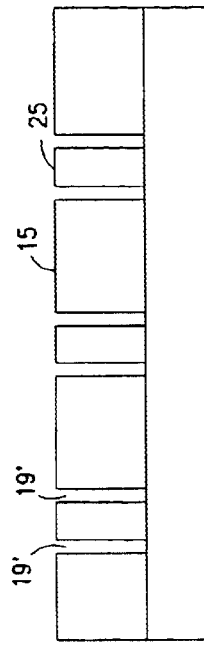
Figure 3F:
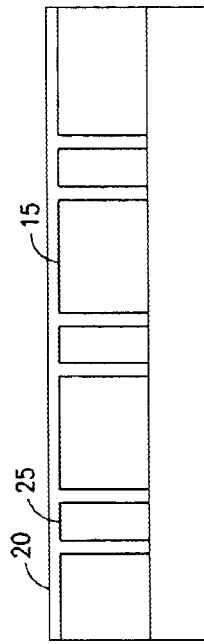
Figure 3G:
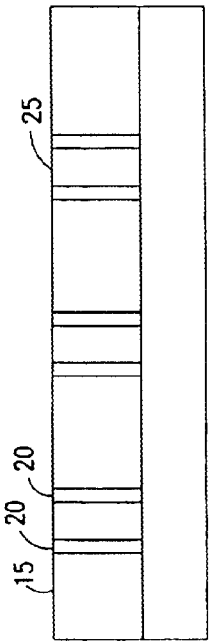
Figure 3A:
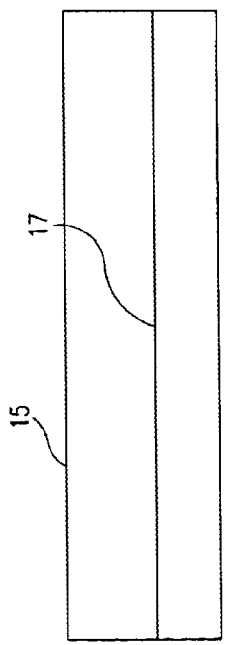
Figure 3B:
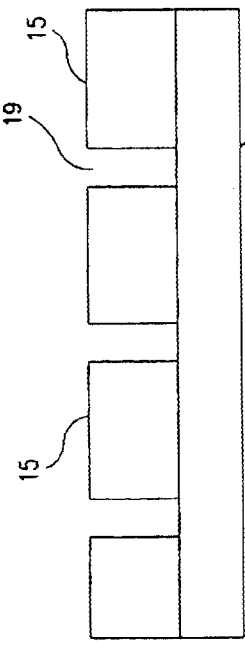
Figure 3C:
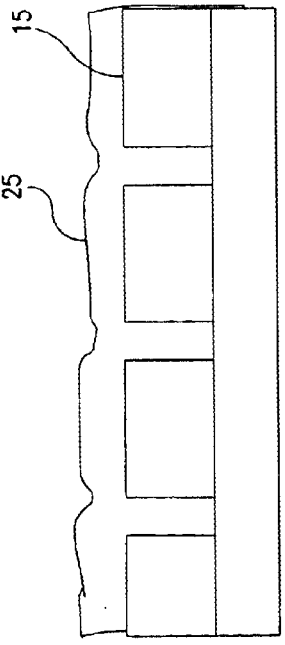

In FIGS. 3B and 4B, at least one trench 19 is etched into substrate 15 using standard lithography and dry etch techniques. These standard techniques are described in "*Silicon Processing for the VLSI Era*", volume 1, by S. Wolf and R. N. Tauber. Alternatively, wet etch techniques, in conjunction with a lithography process, or laser oblation may also be used to create trench 19. Preferably, the trench width is from about 0.1 $\mu$m to about 75 $\mu$m. Next, in FIGS. 3C and 4C, a transducer material 25 is deposited onto the surface of substrate 15 and into trench 19 to form a transducer 25 within the substrate 15. The transducer material may be deposited using a variety of standard deposition techniques, such as PVD, CVD, flame hydrolysis process, and deposition by laser ablation. Transducer material 25 is deposited at a thickness of from about 1 $\mu$m to about 100 $\mu$m. Transducer material 25 is preferably a piezoelectric or ferroelectric material. When an electric voltage 30 is applied to transducer material 25, a mechanical stress should be created on the material. This mechanical stress, in turn, generates acoustic wave 35 when the applied voltage is modulated (i.e., AC voltage). Preferred transducer materials 25 are materials exhibiting strong piezoelectric characteristics, such as lithium niobate and zirconate titanate (PZT). Most preferably, materials such as $LiNbO_3$, $TeO_2$, $PbMbO_4$, alloys thereof or mixtures thereof are used.

In FIGS. 3D and 4D, chemical mechanical polishing (CMP) is used to remove excess transducer material 25 on the surface of substrate 15, leaving transducer material 25 co-planer with the surface of substrate 15. In a typical CMP process step, the substrate surface that is being polished is placed into contact with a rotating polishing pad. A carrier applies pressure against the backside of the substrate. During the polishing process, the pad and table are rotated while a downward force is maintained against the substrate back. A chemical solution which optionally contains a desired abrasive or abrasive types is applied to the pad during polishing. The chemical solution is formulated to include chemicals that react with and soften the surface of the material being polished. The polishing process further requires an abrasive material to assist in removing a portion of the substrate surface that has been softened by a reaction between the polishing composition and the substrate surface material. The abrasive may be incorporated into the polishing pad, into the chemically reactive polishing composition or both. Ingredients in the polishing composition or slurry initiate the polishing process by chemically reacting with the material on the surface of the substrate that is being polished. The polishing process is facilitated by the rotational movement of the pad relative to the substrate as the chemically reactive polishing composition or slurry is provided to the substrate/pad interface. Polishing is continued in this manner until the desired film or amount of film on the substrate surface is removed.

The choice of polishing composition or slurry is an important factor in the CMP step. Depending on the choice of ingredients such as oxidizing agents, film forming agents, acids, bases, surfactants, complexing agents, abrasives, and other useful additives, the polishing slurry can be tailored to provide effective polishing of the substrate layer(s) at desired polishing rates while minimizing surface imperfections, defects and corrosion and erosion. Furthermore, the polishing composition may be selected to provide controlled polishing selectivities to other thin-film materials used in substrate manufacturing. In the present invention, a polishing composition with a high polishing selectivity towards the transducer material in comparison to substrate material is preferred. Most preferably, a polishing composition with a selectivity of greater than 5:1 is used.

Examples of CMP polishing compositions and slurries are disclosed, in U.S. Pat. Nos. 6,068,787, 6,063,306, 6,033, 596, 6,039,891, 6,015,506, 5,954,997, 5,993,686, 5,783,489, 5,244,523, 5,209,816, 5,340,370, 4,789,648, 5,391,258, 5,476,606, 5,527,423, 5,354,490, 5,157,876, 5,137,544, 4,956,313, the specifications of each of which are incorporated herein by reference.

In order to apply AC voltage 30 to transducer material 25, transducer material 25 must be positioned between two electrodes 20. Therefore, a second set of trenches 19' is etched into substrate 15 along both sides of each layer of transducer material 25, in FIG. 3E, so that electrode material 20 can be deposited adjacent to transducer material 25. This second set of trenches 19' may be created using standard lithography and etch techniques. One alternative process for creating this second set of trenches 19' use wet etch techniques without the use of a mask, as shown in FIG. 4E. Using wet etch techniques without a mask requires fewer steps to remove substrate material 15 adjacent to transducer material 25; however, it may also possibly result in the removal of some substrate material 15 from the top surface of substrate 15 as well. Therefore, the effect of the removal of substrate material 15 on the final thickness should be considered when choosing the technique for etching second set of trenches 19'.

After creating the second set of trenches 19', an electrode material 20 is deposited onto the surface of substrate 15 in an amount sufficient to fill the second set of trenches 19', as shown in FIGS. 3F and 4F. Generally, electrode material 20 should be deposited to a thickness of from about 0.1 $\mu$m to about 10 μm. Electrode material 20 may be deposited using a variety of standard deposition techniques, such as PVD, CVD, electroplating, atomic layer deposition, deposition by laser ablation, or vacuum evaporation. Preferred electrode materials 20 include Aluminum, Tungsten, Molybdenum, Copper, or mixtures thereof.

It is possible, when silica is used for substrate 15, that electrode material 20 may not adhere well to substrate 15. Therefore, as an optional step, an adhesion layer such as a layer of Ti, TiN, TiW, alloys thereof or mixtures thereof can be deposited in second set of trenches 19' prior to the deposition of electrode material 20 in order to enhance the adhesion of electrode material 20.

Finally, as shown in FIGS. 3G and 4G, CMP is used again to remove electrode material 20 from the surface of substrate 15, until electrode material 20 is co-planer with substrate 15. The resulting micro-acousto-optic modulator 10 fabricated using this embodiment has sandwiches of electrode 20 and transducer 25 layers completely inlaid within substrate 15.

If the desired transducer 25 or electrode 20 materials are not easily polished using chemical mechanical polishing techniques, an alternative embodiment of the disclosed process may be used. In this alternative process, shown in FIGS. 5A–5L and FIGS. 6A–6L, electrode materials 20 and transducer materials 25 are deposited on the top surface of substrate 15.

In FIG. 5A, substrate 15 is grown on base substrate 17. Alternatively, in FIG. 6A, the substrate itself is substrate 15 and base substrate 17 is not utilized. In FIGS. 5B and 6B, a first layer of electrode material 20' is deposited on the top surface of substrate 15. A layer of transducer material 25 is then deposited on the surface of the first electrode material 20'.

In FIG. 5C, transducer material 25, first electrode material 20' and substrate 15, are patterned creating a first plurality of features 50, each having a top surface, with gaps 55 between the features. The surface of base substrate 17 is exposed in gaps 55 created by the patterning. If base substrate 17 is not utilized, as shown in FIG. 6C, then gaps 55 created by the patterning will extend into substrate 15, but not extend completely through substrate 15. Preferably, the gap is 2 μm to 100 μm deep. The patterning is created using lithography and etch techniques.

Next, as shown in FIGS. 5D and 6D, a first material layer 60 is deposited on top of first plurality of features 50 and into gaps 55. Preferably, first material is selected from a group of silicon dioxide, silicon nitride, doped silicon dioxide, aluminum oxide, aluminum nitride, silicon carbide, polymer, and other electrically insulating materials. Preferably, $SiO_2$, deposited by chemical vapor deposition, may be used. In FIGS. 5E and 6E, first material layer 60 is then polished using CMP to create a co-planer surface comprising transducer layer 25 and first material layer 60, wherein first material layer 60 remains in gaps 55.

In FIGS. 5F and 6F, a second electrode layer 20" is deposited on the co-planer surface. In FIGS. 5G and 6G, second electrode layer 20" and transducer layer 25 are patterned to create a second plurality of features 50' and gaps 55' between the features, wherein a portion of first electrode layer 20' is exposed in gaps 55.' Lithography and etch techniques are used to pattern second electrode layer 20" and transducer layer 25.

Figure 5H:
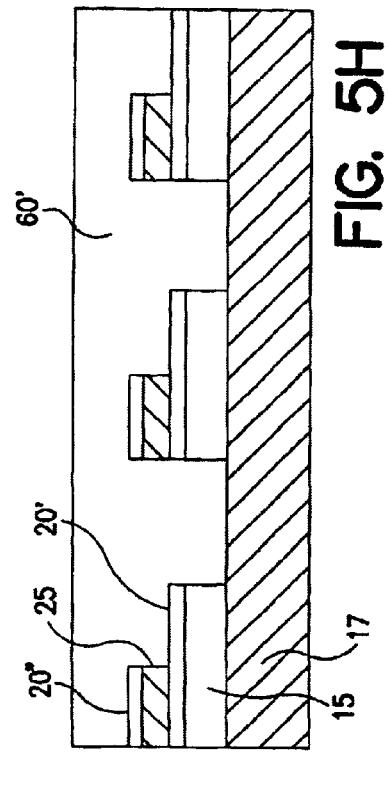
Figure 6H:
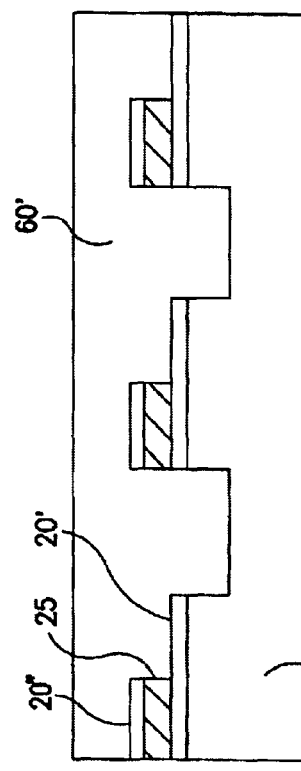

In FIGS. 5H and 6H, a second material layer 60' is deposited onto second plurality of features 50' and into gaps 55'. Preferably, second material layer 60' is selected from the group consisting of silicon dioxide, silicon nitride, doped silicon dioxide, aluminum oxide, aluminum nitride, silicon carbide, polymer, and other electrically insulating materials. Optionally, CMP may be used to planarize second material layer 60' prior to subsequent steps in the fabrication.

Figure 5I:
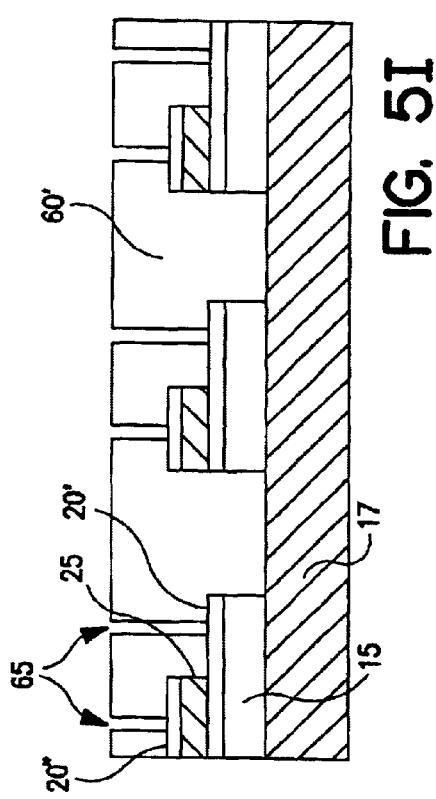
Figure 6J:
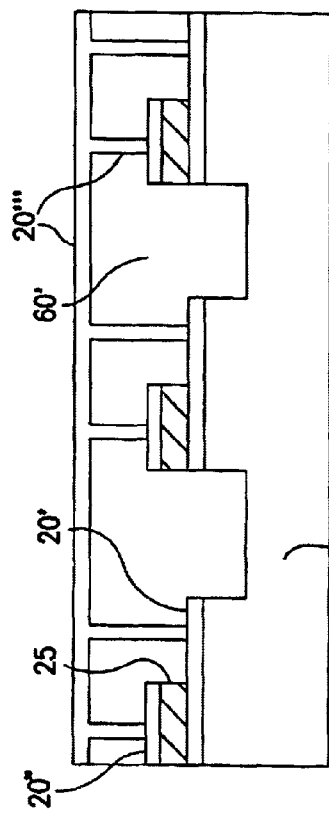
Figure 6I:
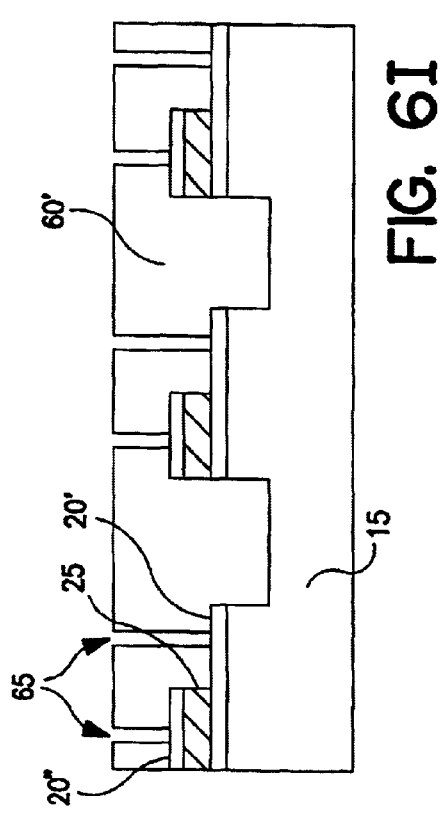

Next, as shown in FIGS. 5I and 6I, second material layer 60' is patterned to form pairs of interconnection trenches 65. In each pair of interconnection trenches 65, one trench extends through second material layer 60' to second electrode layer 20." The second trench extends through second material layer 60' to first electrode layer 20' exposed in gaps 55.' Interconnection trenches 65 may be created using lithography and etch techniques.

Figure 5J:
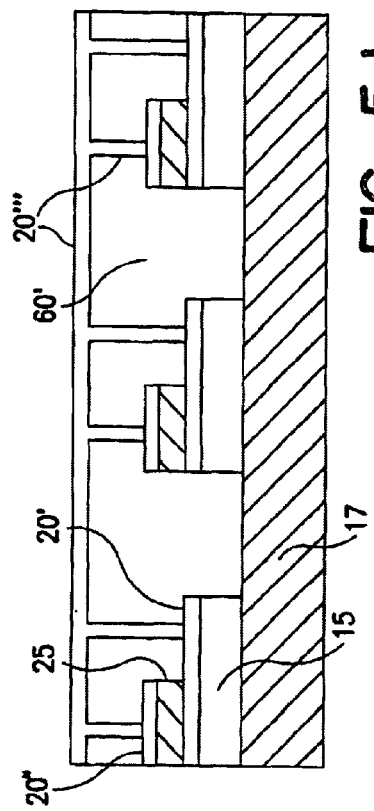
Figure 5K:
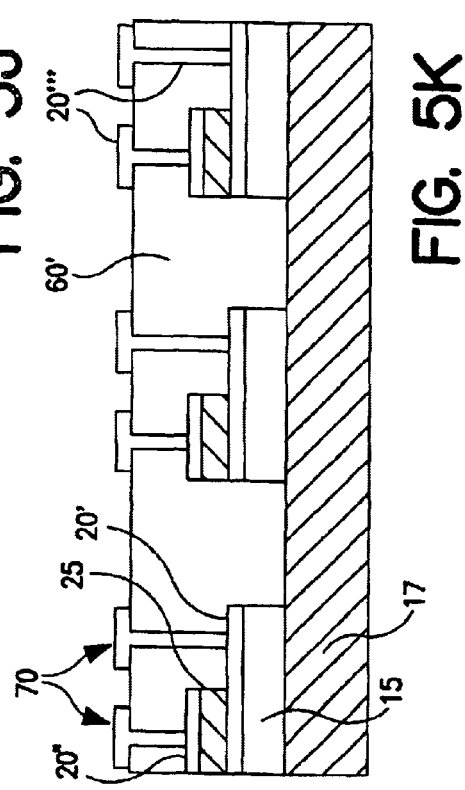
Figure 6K:
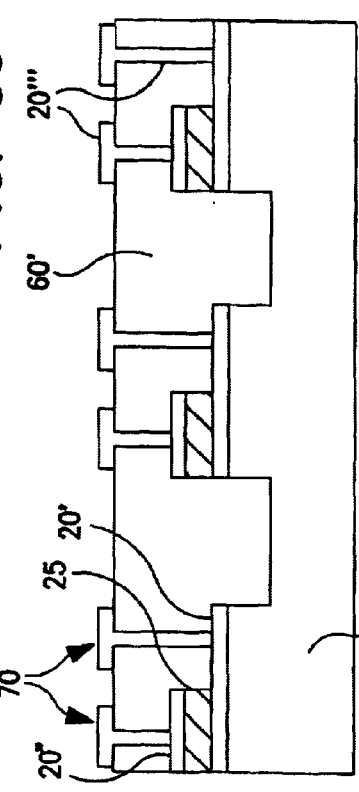

Next, as shown in FIGS. 5J and 6J, a third layer of electrode material 20''' is deposited onto the surface of second material layer 60' and into interconnection trenches 65. In FIGS. 5K and 6K, third layer of electrode material 20''' is patterned to form metal pads 70 for connection with AC voltage source. Metal pads 70 are patterned such that each metal pad 70 is located above one interconnection trench. Therefore, each pair of interconnection trenches is attached to two separate metal pads 70. Third layer of electrode material 20''' is patterned using lithography and etch techniques.

After acousto-optic modulator 10 has been fabricated according to the present invention, further processing will be necessary to complete the optical switch. For example, further processing may include (1) processes to interconnect the two electrodes to a voltage source, (2) processes to optically connect, typically via optical waveguides, the acousto-optic modulators to the optical signals to be processed, and (3) final assembly of the products containing the modulators.

The present invention discloses a micro-acousto-optic modulator based optical switch and a process for fabricating the switch using the microelectronics manufacturing technology. A significant reduction in optical switch feature size can be achieved through the present invention. The disclosed micro-acousto-optic modulator is highly integrated, which allows the resulting optical switch to exhibit improved throughput and higher density, functionality, and yield at a lower cost due to the reduction in mechanical parts and manufacturing cost, due to reduction in labor cost.

It should be understood that a wide range of changes and modifications can be made to the embodiments of process flow and acousto-optic modulators described above. For instance, the basic process disclosed in the present invention can be applied to the manufacture of other types of optical switches, such as liquid crystal based optical switches. It is therefore intended that the foregoing description illustrates rather than limits this invention, and that it is the following claims, including all equivalents, which define this invention.

What is claimed is:

1. A micro-acousto-optic modulator comprising:

a substrate having at least one inlay further comprising a) a first layer of electrode material;

b) a layer of transducer material; and c) a second layer of electrode material;

wherein the layer of transducer material is located between the first layer of electrode material and the second layer of electrode material.

2. The substrate in claim 1 is selected from the group consisting of single crystal substrate and polycrystalline substrate.

3. An optical switch comprising the micro-acousto-optic modulator of claim 1 wherein, when an AC voltage is applied to the layer of transducer material, an acoustic wave forms in the substrate causing diffraction of a light signal passing through the substrate.

4. The micro-acousto-optic modulator of claim 1 having a thickness of less than 3 mm.

5. A micro-acousto-optic modulator comprising:

a) a substrate having an exposed surface;

b) a first layer of electrode material attached to the surface of the substrate;

c) a layer of transducer material attached to the first layer of electrode material; and d) a second layer of electrode material attached to the layer of transducer material, wherein the first layer of electrode material, the layer of transducer material and the second layer of electrode material are embedded within a material layer of electrically insulating material associated with the exposed surface of the substrate.

6. An optical switch comprising the micro-acousto-optic modulator of claim 5 wherein, when an AC voltage is applied to the layers of electrode material, an acoustic wave forms in the substrate causing diffraction of a light signal passing through the substrate.

7. The micro-acousto-optic modulator of claim 5 having a thickness of less than 3 mm.

* * * * *